(12) United States Patent
Hatayama et al.

(10) Patent No.: US 6,269,211 B1
(45) Date of Patent: Jul. 31, 2001

(54) OPTICAL PLANE WAVEGUIDE

(75) Inventors: Hitoshi Hatayama; Eisuke Sasaoka, both of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/518,132

(22) Filed: Mar. 3, 2000

(30) Foreign Application Priority Data

Mar. 5, 1999 (JP) .................................................. 11-059196

(51) Int. Cl.$^7$ .................................................. G02B 6/10

(52) U.S. Cl. .................................................. 385/129

(58) Field of Search .................................. 385/129–147, 385/49

(56) References Cited

U.S. PATENT DOCUMENTS

| | | | | |
|---|---|---|---|---|
| 4,720,824 | * | 1/1988 | Hayashi | 369/44.12 |
| 5,048,907 | * | 9/1991 | Wickman et al. | 385/130 |
| 5,091,986 | * | 2/1992 | Arii et al. | 385/49 |
| 6,144,025 | * | 11/2000 | Tei et al. | 250/226 |

OTHER PUBLICATIONS

Yasuhiro Hida, et al., "Highly–Dense PLC–Type Splitter Using 0.4%–Δ Wafeguides", General Meeting of The Institute of Electronics, Information and Communication Engineers, 1998, pp. 321(with English Translation—2 pages).

* cited by examiner

Primary Examiner—Akm E. Ullah
(74) Attorney, Agent, or Firm—McDermott, Will & Emery

(57) ABSTRACT

The present invention relates to an optical plane waveguide capable of reducing the coupling loss with respect to an optical fiber and achieving downsizing and higher integration. The optical plane waveguide according to the present invention comprises a core region provided in a substrate, and one or more side core regions provided along the tip portion of the core region. The core region and the side core regions have a higher refractive index than the substrate. Moreover, end faces of the core region and the side core regions coincide with the end face of the substrate and function as a light input/output port for signal light. In particular, since the side core regions are provided along the core region and positioned at a peripheral portion of the substrate where the end face of the substrate is included. According to the configuration, the mode field diameter of signal light can be enlarged at least in a direction parallel to a surface of the substrate with a single mode condition satisfied, whereby the coupling loss with respect to the optical fiber can be reduced.

6 Claims, 6 Drawing Sheets

OPTICAL PLANE WAVEGUIDE

BACKGROUND OF THE INVENTION

1. Field of the Invention

The present invention relates to an optical plane waveguide having a core region with a high refractive index provided in a substrate and guiding signal light.

2. Related Background Art

As an optical element for processing, such as branching, an incident light from an input optical fiber and outputting the same to an output optical fiber, an optical plane waveguide is used. The optical plane waveguide comprises a silica substrate provided with a core region having a high refractive index formed therein, and the core region, for example, has a structure for branching the incident light. A light input/output port of the optical plane waveguide is disposed at an end portion of the silica substrate. That is, light incident on the core region of the optical plane waveguide from the input optical fiber propagates through and is branched in the core region, and further the branched light propagates through the core region thereafter so as to be outputted to the output optical fiber.

Recently, the downsizing and integration of the optical plane waveguide are required. For example, a technique disclosed in the Institute of Electronic Information Communication General Assembly C-3-155 in 1998 is for achieving downsizing and further integration for an optical plane waveguide: by increasing the relative refractive index difference of the core region with respect to the substrate to 0.4%, signal light in the core region can be more strongly confined therein, thereby enabling to lessen a radius of curvature of a bent portion of the core region.

SUMMARY OF THE INVENTION

The present inventors have studied the above-mentioned prior art, and consequently found out the following problems. Namely, in the conventional optical plane waveguide, the larger the relative refractive index difference of the core region with respect to the substrate is, the stronger the confinement for signal light in the core region is, and whereby the radius of curvature of the bent portion of the core region can become smaller. However, in order to maintain the stability of the optical characteristics of the optical plane waveguide by restraining generation of a higher order mode light (namely, generation of light other than fundamental mode light), the width and the thickness of the core region should be narrower as the relative refractive index difference of the core region with respect to the substrate is larger. In the case the width and the thickness of the core region are smaller, the mode field diameter of a fundamental mode light propagating through the core region is smaller than that of a fundamental mode light propagating through an optical fiber, and whereby the coupling loss between the optical plane waveguide and the optical fiber increases.

For example, when the cross-section perpendicular to the optical axis of the core region is designed to be a square shape in consideration of the polarization independence, when the following relational expression:

$$a \leq \lambda c / (2n1 \cdot \sqrt{\Delta n}).$$

is satisfied, wherein, a is the width (or thickness) of the core region, n1 is the refractive index of the core region, $\Delta n$ is the relative refractive index difference of the core region with respect to the substrate, and $\lambda c$ is the cut off wavelength, generation of a higher order mode light can be restrained such that only a fundamental mode light can propagate through the core region. As it can be seen in the formula, in order to restrain the generation of a higher order mode light, as the relative refractive index difference $\Delta n$ is larger, the width (or thickness) a of the core region should be smaller.

FIG. 1 is a graph showing the relationship between the relative refractive index difference $\Delta n$ of the core region with respect to the substrate and the coupling loss in such a case. The graph shows the coupling losses of the cases with the wavelengths $\lambda$ 1.3 $\mu m$ and 1.55 $\mu m$, and the cutoff wavelengths $\lambda c$ of 1.3 $\mu m$ and 1.55 $\mu m$, respectively. As can be seen from the graph, as the relative refractive index difference $\Delta n$ is larger, the width (or thickness) a of the core region should be smaller because the mode field diameter of a fundamental mode light propagating through the core region is smaller than that of a fundamental mode light propagating through an optical fiber and thus the coupling loss is larger. In particular, when the relative refractive index difference $\Delta n$ is 0.4% or more, the coupling loss drastically increases.

The present invention has been achieved for solving the above-mentioned problems, and an object thereof is to provide an optical plane waveguide with a small coupling loss with respect to an optical fiber, capable of achieving downsizing and high integration.

An optical plane waveguide according to the present invention comprises a substrate provided with a core region having a higher refractive index than the substrate and one or more side core regions. The core region has a light input/output port at the end face of the substrate. The side core regions are provided along the core region and positioned at a peripheral portion of the substrate where the end face of the substrate is included. Also, the side core regions function for enlarging the mode field diameter of signal light in the direction parallel to the surface of the substrate. In accordance with the optical plane waveguide, since the side core regions are provided at one or both sides of the core region in the vicinity of the end face of the substrate, the mode field diameter of signal light can be enlarged in the direction parallel to the surface of the substrate. Therefore, even in the case the cross-sectional size of the core region is small, the coupling loss between the light input/output port on the end face of the optical plane waveguide and the optical fiber can be reduced because the side core regions are provided for enlarging the mode field diameter of signal light.

Further, in an optical plane waveguide according to the present invention, the widths of the core region and the side core regions are adjusted such that the optical coupling between the core region and the side core regions is improved and the propagation constant of the fundamental mode is changed continuously in the traveling direction, while restraining generation of a higher order mode light. In particular, it is preferable to have a narrow width of the core region and wide widths of the side core regions in a region where the normalized propagation constant of a higher order mode light is 0 or less. In this case, the mode conversion from the fundamental mode to the higher order mode is restrained and accordingly the coupling loss between the light input/output port of the optical plane waveguide and the optical fiber can be reduced.

Moreover, in an optical plane waveguide according to the present invention, each of the side core regions has a width of a predetermined size or more, and the distance between the core region and the side core regions is adjusted such that the propagation constant of the fundamental mode light is changed continuously along its traveling direction. In this case, since each of the side core regions has a width of a predetermined size or more, a sufficient processing accuracy can be ensured so that the effect of providing the side core regions can be obtained stably.

In an optical plane waveguide according to the present invention, the width of the core region is set such that the normalized propagation constant of the higher order mode light can be 0 or less as well as the thickness of the core region is set to be larger than the width of the core region. In this case, since the mode field diameter of the fundamental mode light can be enlarged not only in the lateral direction but also in the vertical direction (thickness direction of the core region) of the substrate, the coupling loss can further be reduced. Furthermore, in the optical plane waveguide, a circuit whose characteristics are not influenced by the higher order mode light in the thickness direction of the core region (for example, a branching circuit) is formed in the substrate, and the circuit is connected with the above-mentioned light input/output port. In this case, downsizing of the circuit can be achieved.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Hereinafter embodiments of the present invention will be explained in detail with reference to FIGS. 2A, 2B, 3 to 6, 7A and 7B. In the explanation of the drawings, the same components are applied with the same numerals and redundant explanation is not provided.

First Embodiment

Figure 1:
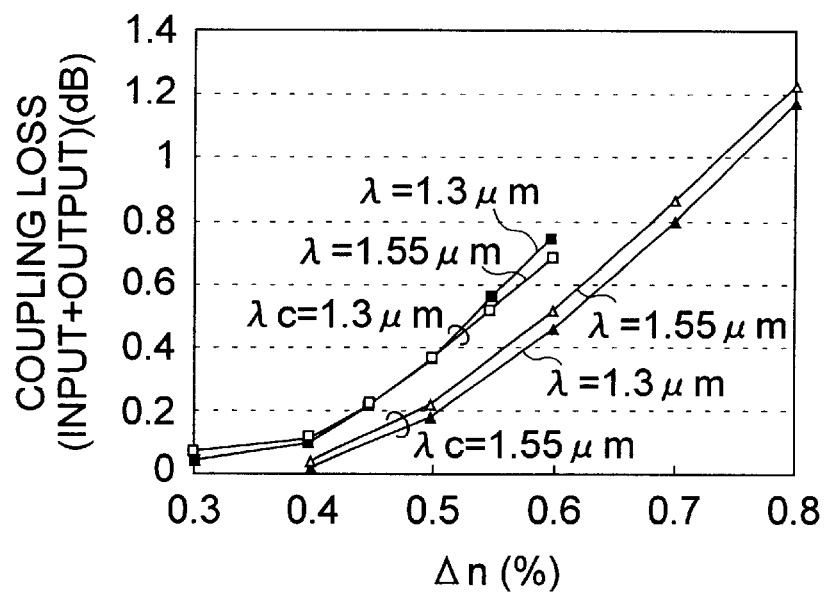
FIG. 1 is a graph showing the relationship between a relative index difference Δn of the core region with respect to the substrate and the coupling loss between the core region and the attached optical fiber.
Figure 2A:
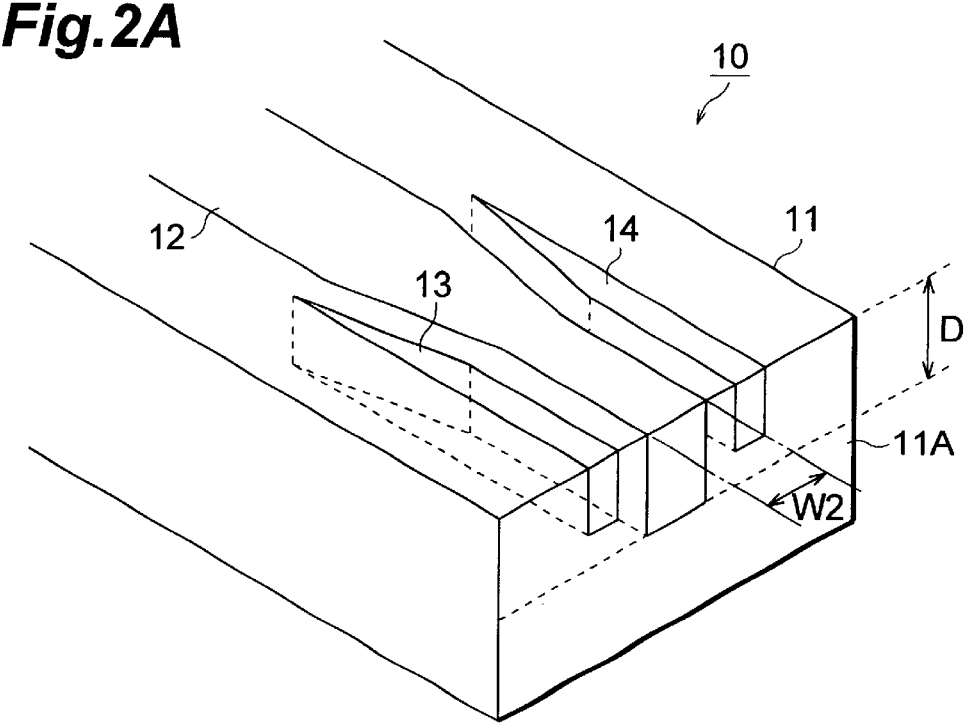
FIGS. 2A and 2B are perspective views of an optical plane waveguide according to a first embodiment of the present invention.
Figure 2B:
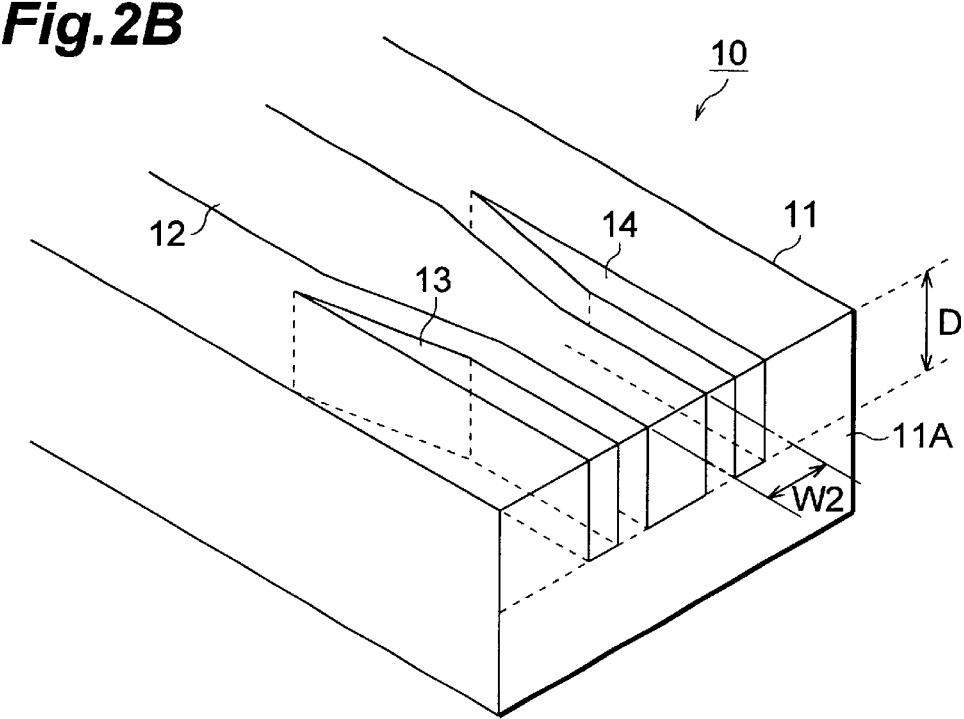

A first embodiment of an optical plane waveguide according to the present invention will be explained. FIGS. 2A and 2B are perspective views of the optical plane waveguide according to the first embodiment. The FIGURES. show the vicinity of one end face 11A of a silica substrate 11 comprising an optical plane waveguide 10 according to this embodiment.

As shown in FIG. 2A, the optical plane waveguide 10 according to this embodiment comprises the silica substrate 11, a core region 12 and side core regions 13, 14 provided in the silica substrate 11. The refractive indices of the core region 12 and the side core regions 13, 14 are higher than that of the silica substrate 11. Moreover, each one end of the core region 12 and the side core regions 13, 14 is provided on the end face 11A of the silica substrate 11 as a light input/output port. The side core regions 13, 14 are formed with a distance at both sides of tip portion of the core region 12 in the peripheral region of the silica substrate 11 where the end face 11A of the silica substrate 11 is included. According to the configuration, in the optical plane waveguide 10 according to this embodiment, the mode field diameter of signal light can be enlarged in the direction parallel to the surface of the silica substrate 11.

Accordingly, even if the relative refractive index difference Δn of the core region 12 with respect to the silica substrate is increased and the width of the core region 12 is reduced for restraining generation of a higher order mode light (namely, generation of light other than fundamental mode light), the mode field diameter of the fundamental mode light in the optical plane waveguide 10 can be enlarged to the mode field diameter of a fundamental mode light in the optical fiber. Therefore, in the case the end face of the optical fiber is approached to the light input/output port of the end face 11A of the silica substrate 11, the coupling loss therebetween can be reduced.

The mode field diameter of signal light can be enlarged also by tapering the width of the core region 12 without providing the side core regions 13, 14 with the width of the core region 12 enlarged toward the end face 11A side. However, in this case, the effective refractive index of the core region 12 with respect to signal light becomes gradually higher as the width of the core region 12 becomes wider so that the mode conversion from the fundamental mode to the higher order mode can easily be generated due to fluctuation of the relative refractive index difference of the core region 12 with respect to the silica substrate 11, a waveguide defect, or the like, and thus there is a possibility of increasing the coupling loss. However, since the side core regions 13, 14 are formed at both sides of the tip portion of the core region 12 with a distance without enlarging the width of the core region 12 unnecessarily in the optical plane waveguide 10 according to this embodiment, generation of a higher order mode light is restrained as well as the mode field diameter of a fundamental mode light can be enlarged, and thus the coupling loss with respect to the optical fiber can be reduced. Moreover, although the thickness (depth from the surface of the substrate 11) of the core region 12 is larger than that of the side core regions 13, 14 in the above-mentioned configuration as shown in FIG. 2A, the thickness (depth from the surface of the substrate 11) of the core region 12 and the side core regions 13, 14 can be same for the production convenience as shown in FIG. 2B.

Figure 3:
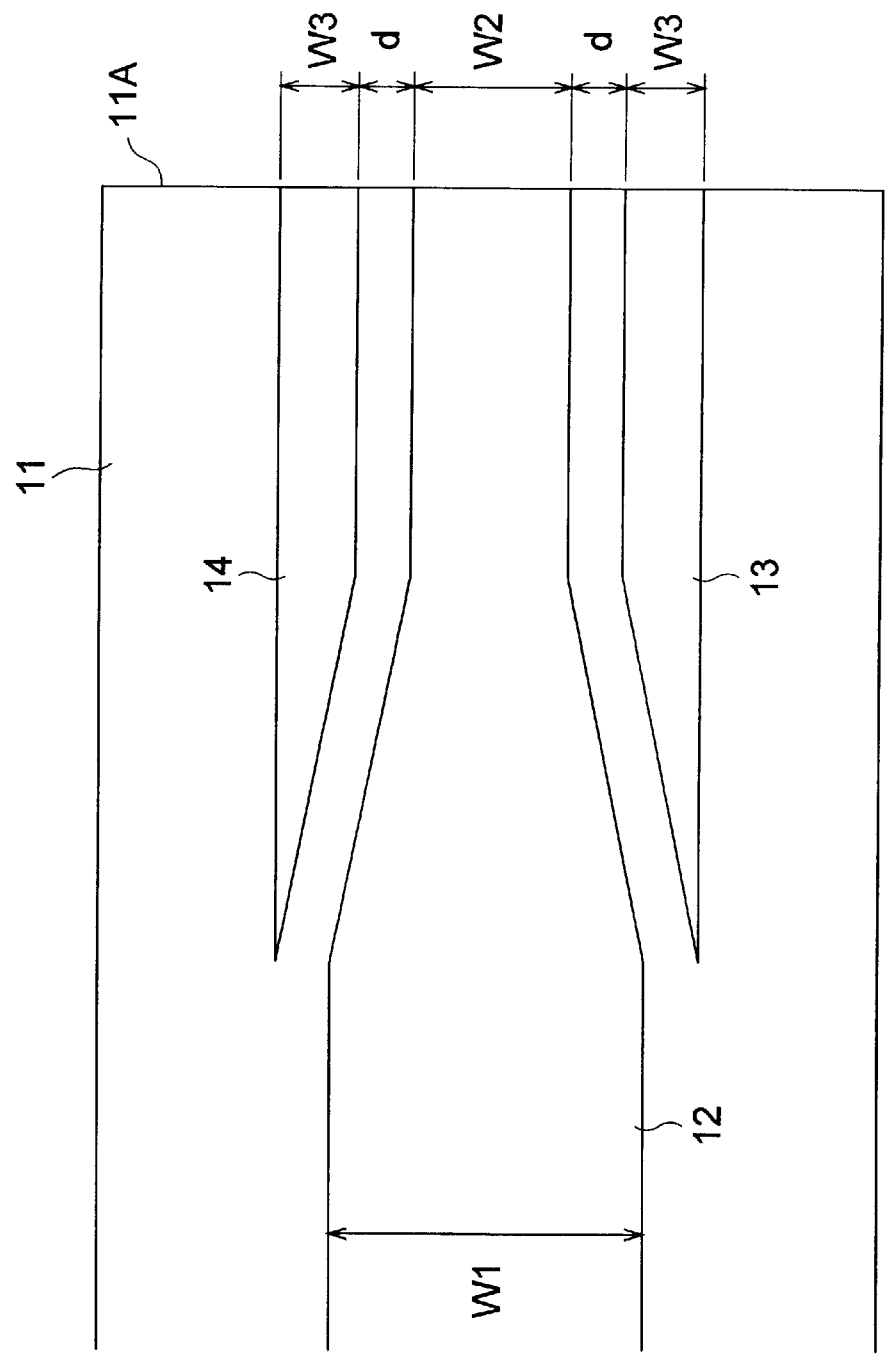
FIG. 3 is a diagram for explaining the condition of the simulation calculation of the first embodiment.

The result of the simulation calculation of the relationship between the core region width W2 and the coupling loss will be explained. FIG. 3 is a diagram for explaining the condition at the time of the simulation calculation. In the calculation, the width of the core region 12 at the end face 11A of the substrate 11 is defined as W2, the width of each of the side core regions 13, 14 as W3, and the distance between the core region 12 and the side core regions 13, 14 as d. Moreover, the relative refractive index difference Δn of the core region 12 and the side core regions 13, 14 with respect to the substrate 11 is set at 0.5%, W1=W2+2×W3 at a constant value of 6.2 μm, and the distance d at a constant value of 1.5 μm.

Figure 4:
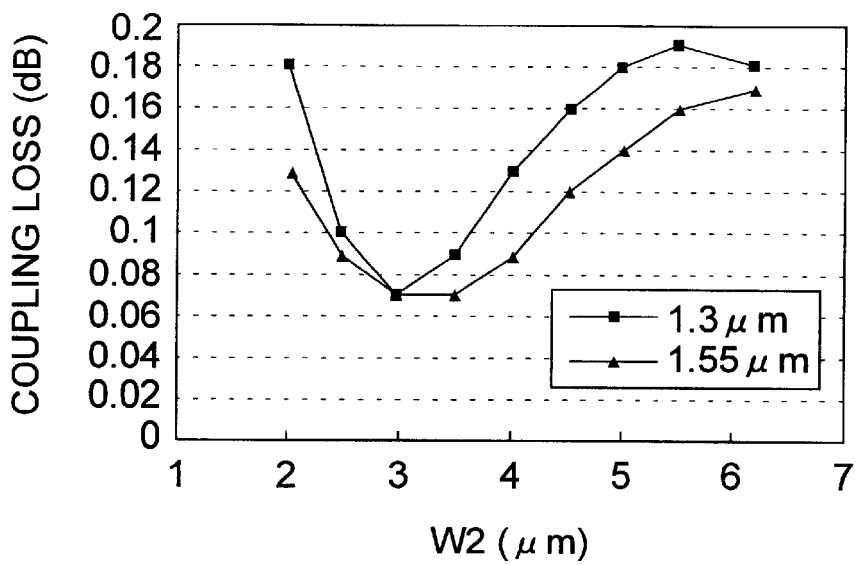
FIG. 4 is a graph showing the result of the simulation calculation of the relationship between the core region width and the coupling loss.
Figure 5:
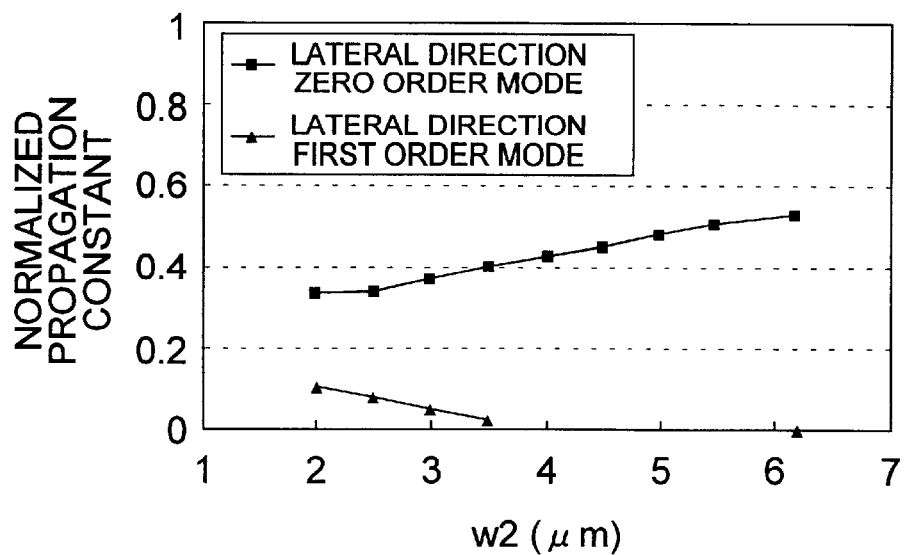
FIG. 5 is a graph showing the result of the simulation calculation of the relationship between the core region width and the normalized propagation constant.

FIG. 4 is a graph showing the result of the simulation calculation of the relationship between the width W2 of the core region 12 and the coupling loss. As can be seen from the graph, the coupling loss can be minimum when the width W2 of the core region 12 is in the vicinity of a 3 μm to 4 μm. FIG. 5 is a graph showing the result of the simulation calculation of the relationship between the width W2 of the core region 12 and the normalized propagation constant. As can be seen from the graph, the normalized propagation constant of the fundamental mode light has a positive value and the normalized propagation constant of the higher order mode light is 0 or less when the width W2 of the core region 12 is about 3.5 μm or more. That is, in the range that the width W2 of the core region 12 is about 3.5 μm or more, generation of the higher order mode light can be restrained so that only the fundamental mode light can propagates. Further, in this range, with a smaller width W2 of the core region 12, namely, with a larger width W3 of the side core region 13, 14, the coupling loss can be smaller. For example, in the wavelength of 1.55 μm, when the width W2 of the core region 12 is 6 μm, the coupling loss is 0.17 dB, but when the width W2 of the core region 12 is 3.5 μm, the coupling loss can be reduced to 0.07 dB.

The mode field diameter of signal light propagating through the optical plane waveguide 10, namely, the coupling loss depends on the relative refractive index difference Δn of the core region 12 with resect to the substrate 11, the width W2 of the core region 12, the width W3 of the side core regions 13, 14, and the distance d between the core region 12 and the side core regions 13, 14. It is preferable that these values are adjusted such that the optical coupling between the core region 12 and the side core regions 13, 14 is improved and the propagation constant of the fundamental mode light is changed continuously in its traveling direction, while restraining generation of the higher order mode light.

Moreover, in the optical plane waveguide 10 according to this embodiment, the mode field diameter of the fundamental mode light is enlarged in the lateral direction (corresponding to the direction parallel to the surface of the silica substrate 11) by providing the side core regions at both sides of the core region 12, but it is not enlarged in the vertical direction (the thickness direction of the silica substrate 11). In order to further reduce the coupling loss, it is preferable to set the width W2 of the core region 12 in a range wherein the normalized propagation constant of the higher order mode light can be 0 or less, and the thickness of the core region 12 larger than the width W2 of the core region for further reducing the coupling loss. According to the configuration, since the mode field diameter of the fundamental mode light can be enlarged not only in the lateral direction but also in the vertical direction, the coupling loss can further be reduced.

Figure 6:
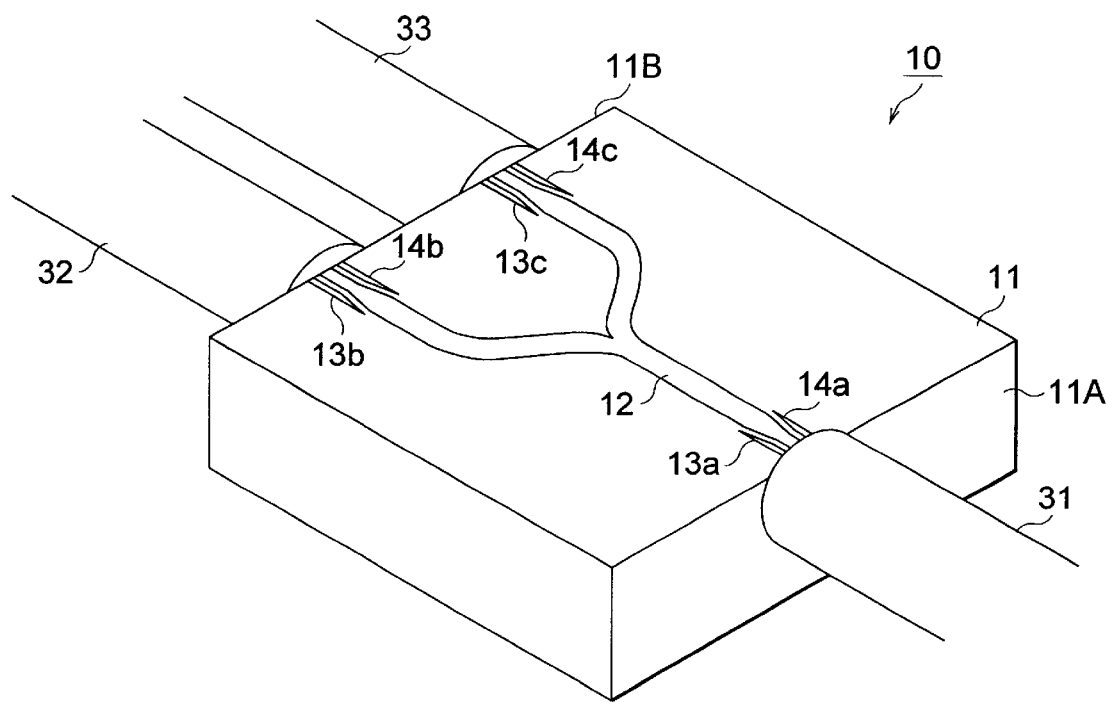
FIG. 6 is a diagram showing the optical plane waveguide according to the first embodiment with an input optical fiber and output optical fibers.

FIG. 6 is a diagram showing an input optical fiber 31 and output optical fibers 32, 33, in addition to the optical plane waveguide 10 according to the first embodiment. The core region 12 of the optical plane waveguide 10 shown in the figure comprises a Y branching structure, with one of the three end faces of the core region 12 provided at the end face 11A of the silica substrate 11, and the two other end faces provided at the end face 11B of the silica substrate 11. The side core regions 13a, 14a, 13b, 14b, 13c, 14c are formed at both sides of the tip portions of the core regions 12 with a predetermined distance.

Since the side core regions 13a and 14a are provided at the sides of one of tip portions of the core region 12, the coupling loss at the time of inputting the signal light from the input optical fiber 31 to the core region 12 of the optical plane waveguide 10 is small. The inputted signal light is branched in two while propagating through the core region 12 toward the end face 11B. In branching in two, it is preferable that the higher order mode in the thickness direction does not influence the branching characteristics even in the case the thickness of the core region 12 is larger than the width thereof. Since the side core regions 13b and 14b are provided, the coupling loss at the time of inputting the signal light from the core region 12 of the optical plane waveguide 10 to the output optical fiber 32 is small. Similarly, since the side core regions 13c and 14c are provided, the coupling loss at the time of inputting the signal light from the core region 12 of the optical plane waveguide 10 to the output optical fiber 33 is small.

As heretofore mentioned, according to the first embodiment, since a radius of curvature of the bent portion of the core region can be smaller by increasing the relative refractive index difference Δn of the core region with respect to the substrate 11 and strengthening the confinement of signal light in the core region, further downsizing and integration for the optical plane waveguide can be realized. In contrast, although the cross-sectional size of the core region becomes smaller for a smaller relative refractive index difference Δn of the core region with respect to the substrate, the mode field diameter of the fundamental mode light can be enlarged because of the existence of the side core regions, and whereby the coupling loss with respect to the optical fiber can be reduced.

Second Embodiment

A second embodiment of an optical plane waveguide according to the present invention will be explained. FIGS. 2A and 7B are perspective views of the optical plane waveguide according to the second embodiment. The FIGS. show the vicinity of one end face 21A of a silica substrate 21 comprising an optical plane waveguide 20 according to this embodiment.

Figure 7A:
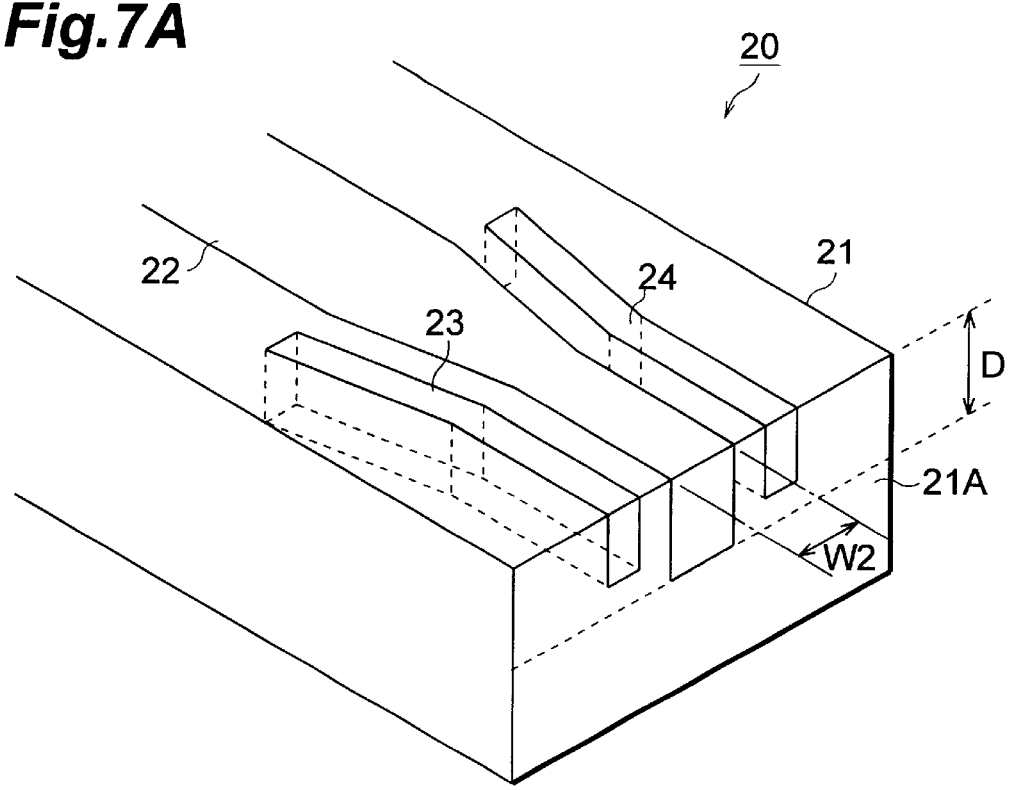
FIGS. 7A and 7B are perspective views of an optical plane waveguide according to a second embodiment of the present invention.
Figure 7B:
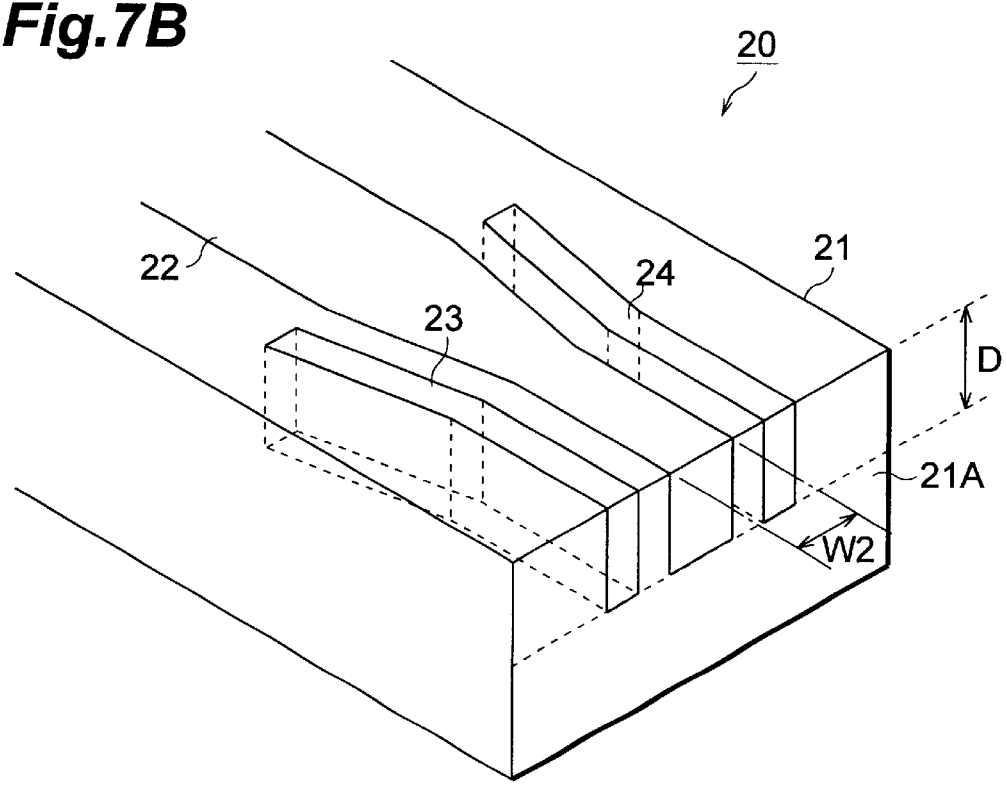

As shown in FIG. 7A, the optical plane waveguide 20 according to the second embodiment comprises the silica substrate 21, with side core regions 23, 24 provided at both sides of the tip portion of a core region 22 in the peripheral portion where the end face 21A of the silica substrate 21 is included. This embodiment has the same configuration as the first embodiment in that the refractive indices of the core region 22 and the side core regions 23, 24 are higher than that of the silica substrate 21, and the mode field diameter of signal light is enlarged in the direction parallel to the surface of the silica substrate 21. However, the optical plane waveguide 20 according to the second embodiment differs from that of the first embodiment as follows.

In the optical plane waveguide 10 of the first embodiment, since the width of the side core regions 13, 14 becomes narrower as it gets away from the end face 11A of the silica substrate 11 so that the tip thereof has a pointed shape, a high processing accuracy is required. In contrast, in the optical plane waveguide 20 according to the second embodiment, the width of the side core regions 23, 24 is set at a predetermined size or more, and the distance between the core region 22 and the side core regions 23, 24 is adjusted such that the propagation constant of the fundamental mode light is changed continuously in its traveling direction. The predetermined width here is a width capable of providing a sufficient processing accuracy in consideration of the processing accuracy limit, for example, it is about 2 $\mu$m or more in the case the side core regions 23, 24 are formed by the RIE process.

The width of the side core regions 23, 24 in this embodiment can be changed continuously in the traveling direction of signal light while maintaining the above-mentioned predetermined width, but it is preferable that the distance between the core region 22 and the side core regions 23, 24 is adjusted so as to change continuously in the traveling direction of signal light. In this case, by narrowing the distance therebetween toward the end face 21A of the silica substrate 21, the mode field diameter of the fundamental mode light can be enlarged so that the coupling loss with respect to the optical fiber can be reduced.

As in the case of the first embodiment, it is important that the optical coupling between the core region 22 and the side core regions 23, 24 is improved and the propagation constant of the fundamental mode light is adjusted to change continuously along the traveling direction of signal light, while restraining generation of the higher order mode light. Further, it is preferable that the width of the core region 22 is set such that the normalized propagation constant of a higher order mode light is 0 or less as well as the thickness of the core region 22 is set larger than the width thereof in order to further improve the coupling loss. Moreover, it is preferable to have a configuration as shown in FIG. 6 by combining the optical plane waveguide 20 according to the second embodiment and optical fibers. Although the thickness (depth from the surface of the substrate 21) of the core region 22 is larger than those of the side core regions 23, 24 in the configuration shown in FIG. 7A, the thickness of the core region 22 and the side core regions 23, 24 can be same for the production convenience as shown in FIG. 7B.

As heretofore mentioned, in accordance with the second embodiment, since the relative refractive index difference $\Delta n$ of the core region with respect to the substrate can be made higher so as to strengthen the confinement of signal light propagating through the core region and make a radius of curvature of the bent portion of the core region smaller, further downsizing and integration can be realized. In contrast, although the cross-sectional size of the core region becomes smaller for a smaller relative refractive index difference $\Delta n$ of the core region with respect to the substrate, the mode field diameter of the fundamental mode light can be enlarged because of the existence of the side core regions, and whereby the coupling loss with respect to the optical fiber can be reduced. Further, since the widths of the side core regions is a predetermined size or more in the second embodiment, a sufficient processing accuracy can be provided, and thus the effect of providing the side core regions can be obtained stably.

As heretofore explained in detail, in accordance with the present invention, the side core regions are provided at one or both sides of the core region in the peripheral part of the substrate where the end face of the substrate is included. By the configuration, the mode field diameter of signal light propagating through the core region can be enlarged at least in the direction parallel to the surface of the substrate. Therefore, since the relative refractive index difference of the core region with respect to the substrate can be made higher so as to strengthen the confinement for signal light in the core region and make a radius of curvature of the bent portion of the core region smaller, further downsizing and integration can be realized. In contrast, although the cross-sectional size of the core region becomes smaller for a smaller relative refractive index difference of the core region with respect to the substrate, the mode field diameter of the fundamental mode light can be enlarged because of the existence of the side core regions, and whereby the coupling loss with respect to the optical fiber can be reduced.

Moreover, in the case the widths of the core region and the side core regions are adjusted such that the optical coupling between the core region and the side core regions is improved and the propagation constant of the fundamental mode light changes continuously in its traveling direction, while restraining generation of the higher order mode light, or, in particular, in the case the width of the core region is narrow and the widths of the side core regions are wide in the region wherein the normalized propagation constant of the higher order mode light of 0 or less, the mode conversion from the fundamental mode to the higher order mode is restrained, and accordingly, the coupling loss between the light input/output port of the optical plane waveguide and the optical fiber can be reduced.

Further, in the case the width of the side core regions is a predetermined size or more and the distance between the core region and the side core regions is adjusted such that the propagation constant of the fundamental mode light changes continuously in its traveling direction, a sufficient processing accuracy can be provided and thus the effect of providing the side core regions can be obtained stably.

In the case the width of the core region is set such that the normalized propagation constant of the higher order mode light can be 0 or less as well as the thickness of the core region is set to be larger than the width of the core region, since the mode field diameter of the guided ray of the ground mode can be enlarged not only in the lateral direction but also in the vertical direction (thickness direction of the core region), the coupling loss can further be reduced. Furthermore, a circuit, whose characteristics are not influenced by the higher order mode light in the thickness direction of the core region, is formed in the substrate as a part of the core region, and the circuit is connected with the light input/output port, a small size of the circuit can be achieved.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical plane waveguide comprising:
   a substrate having a predetermined refractive index;
   a core region having a higher refractive index than said substrate, said core region provided in said substrate and having a light input/output port on an end face of said substrate; and
   one or more side core regions each having a higher refractive index than said substrate, said side core regions extending along said core region from the end face of said substrate and provided with a predetermined distance from said core region.

2. An optical plane waveguide according to claim 1, wherein widths of said core region and each of said side core regions are changed at a predetermined portion where the propagation constant of a fundamental mode light is changed continuously along a traveling direction of said fundamental mode light.

3. An optical plane waveguide according to claim 1, wherein a width of said core region is narrowed and a width of said side core region is widened in a region where the normalized propagation constant of a higher order mode light is 0 or less.

4. An optical plane waveguide according to claim 1, wherein a distance between said core region and said side core region is set such that the propagation constant of a fundamental mode light changes continuously along a traveling direction of said fundamental mode light.

5. An optical plane waveguide according to claim 1, wherein a width of said core region is set such that the normalized propagation constant of a higher order mode light is 0 or less, and a thickness of said core region is set larger than the width of said core region.

6. An optical plane waveguide according to claim 5, further comprising an optical circuit provided in said substrate and optically connected to said light input/output port of said core region.

* * * * *